(12) United States Patent
Cadloni et al.

(10) Patent No.: US 11,379,304 B1
(45) Date of Patent: Jul. 5, 2022

(54) MITIGATING READ DISTURB EFFECTS IN MEMORY DEVICES

(71) Applicant: Micron Technology, Inc., Boise, ID (US)

(72) Inventors: Gerald L. Cadloni, Longmont, CO (US); Mark Ish, San Ramon, CA (US); James P. Crowley, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/160,194

(22) Filed: Jan. 27, 2021

(51) Int. Cl.
*G11C 29/00* (2006.01)
*G06F 11/10* (2006.01)
*G06F 11/07* (2006.01)
*G06F 12/02* (2006.01)
*G06F 12/0882* (2016.01)
*G06F 12/1081* (2016.01)
*G06F 11/30* (2006.01)

(52) U.S. Cl.
CPC ........ *G06F 11/1068* (2013.01); *G06F 11/076* (2013.01); *G06F 11/0772* (2013.01); *G06F 11/3037* (2013.01); *G06F 12/0246* (2013.01); *G06F 12/0882* (2013.01); *G06F 12/1081* (2013.01); *G06F 2212/7201* (2013.01)

(58) Field of Classification Search
CPC ............ G06F 11/1068; G06F 11/0772; G06F 11/076; G06F 11/3037; G06F 12/0246; G06F 12/0882; G06F 12/1081; G06F 2212/7201

See application file for complete search history.

(56) References Cited

U.S. PATENT DOCUMENTS

| | | | |
|---|---|---|---|
| 2016/0225461 A1* | 8/2016 | Tuers | G11C 16/26 |
| 2017/0076811 A1* | 3/2017 | Reusswig | G11C 29/52 |
| 2020/0118636 A1* | 4/2020 | Athreya | G11C 16/08 |

* cited by examiner

*Primary Examiner* — Samir W Rizk
(74) *Attorney, Agent, or Firm* — Lowenstein Sandler LLP (57) ABSTRACT

A total read counter, a plurality of die read counters, and a plurality of block read counters are maintained. Each die read counter is associated with a respective die of a memory device. A value of a block read counter and a value of a die read counter are determined for a specified block. Based on the value of the block read counter, the value of the die read counter, and the value of the total read counter, an estimated number of read events associated with the specified block of the memory device is determined. Responsive to determining that the estimated number of read events satisfies a predefined criterion, a media management operation of one or more pages associated with the specified block is performed.

20 Claims, 7 Drawing Sheets

MITIGATING READ DISTURB EFFECTS IN MEMORY DEVICES

TECHNICAL FIELD

Embodiments of the disclosure relate generally to memory sub-systems, and more specifically, relate to mitigating read disturb effects in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to mitigating read disturb effects in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

When data is read from a memory cell, nearby or adjacent memory cells can experience what is known as read disturb. Read disturb is the result of continually reading from one memory cell without intervening erase operations, causing other nearby memory cells to change over time. If too many read operations are performed on a memory cell, data stored at adjacent memory cells of the memory device can become corrupted, which can result in a higher error rate of the data stored at the memory cell. Read disturb can increase the use of an error detection and correction operation (e.g., an error control operation) for subsequent operations (e.g., read and/or write) performed on the memory cell. The increased use of the error control operation can result in degradation of the performance of a memory sub-system. In addition, as the error rate for a memory cell or block continues to increase, it may eventually surpass the error correction capabilities of the memory sub-system, leading to an irreparable loss of the data. Furthermore, as more resources of the memory sub-system are used to perform the error control operation, fewer resources are available to perform other read operations or write operations.

The error rate associated with data stored at a block can increase due to read disturb. Therefore, upon a threshold number of read operations being performed on the block, the memory sub-system can perform various media management operations, such as the data integrity check (also referred to herein as a "scan") to verify that the data stored at the block does not include errors. During the data integrity check, one or more reliability statistics are determined for data stored at the block. One example of a reliability statistic is raw bit error rate (RBER). The RBER corresponds to a number of bit errors per unit of time that the data stored at the block experiences.

At times, a memory sub-system can monitor the number of read operations performed on a particular block and perform a scan operation when the read count (i.e., the number of read operations) meets and/or exceeds a certain read threshold. Thus, the number of read counters required to determine when to perform data integrity checks at the block level can consume a large amount of available memory space (e.g., RAM). For example, for a memory sub-system with a maximum capacity of 16 terabytes, maintaining a read count at the block level would require 545,248 32-bit counters, and would consume over 2.26 megabytes.

In order to consume less memory space, a memory sub-system can maintain a read count at the die level, rather than at the block level. Each die counter contains a scan trigger event based on a window count limit. Randomly within the window count limit, a block and an at-risk page set is scanned for behavioral issues (e.g., is scanned for RBER). The scan results can lead to a decision to either refresh the block or allow the block to remain in the read pool. While this method of addressing read disturb requires fewer counters (e.g., a 16-bit counter for each die in the memory sub-system), to be effective, the window count limits should be relatively low. Such low window count limits can lead to more scans, thus adversely affecting the memory sub-system's quality of service (QoS).

Aspects of the present disclosure address the above-noted and other deficiencies by implementing a memory sub-system that mitigates read disturb effects by maintaining a fewer number of read counters. Thus the memory sub-system controller can maintain a die read counter for each die of a memory device, a block read counter for the number of blocks per die, and a total read counter to count the total number of read operations for the memory device. For example, for a memory device that has 256 dies and 1,352 blocks per die, the memory sub-system controller can maintain 256 die read counters (one for each die), 1,352 block read counters (one for each number of blocks per die), as well as a total read counter. Upon detecting a read page event, the total read counter, the die read counter associated with the die being read, and the block read counter associated with the block number being read are each incremented by a specified value (e.g., by 1). Using these three types of counters, the memory sub-system controller populates a matrix of read count values for each block. Each block is represented by a block-die combination in the matrix.

To populate the matrix, the memory sub-system controller can first calculate the share of reads associated with each block (i.e., the block read counter value divided by the total read counter value) and the share of reads associated with each die (i.e., the die read counter value divided by the total read counter value). The memory sub-system controller can then multiply the share of reads associated with the block in the block-die combination by the share of reads associated with the die in the block-die combination. To determine the final read count values in the matrix, the resulting value is multiplied by the total read count and rounded to the nearest integer. In some implementations, the memory sub-system controller calculates a read count value for each block-die combination by multiplying the block read counter value in the block-die combination by the die read counter value in the block-die combination and dividing by the total read counter value, rounded to the nearest integer.

The matrix read values represent an estimate of the read events for pages of the block-die combination. A block-die combination represents a specific block of the memory device. Once the matrix read value for a block-die combination reaches a threshold value, the memory sub-system controller can perform a data integrity scan of the pages associated with the block-die combination.

In some implementations, the counter values can be maintained in volatile memory and periodically transmitted to non-volatile memory. The matrix read values can be determined in volatile memory and transmitted to non-volatile periodically and/or upon memory sub-system power off. When the memory sub-system is powered on, matrix read values stored in non-volatile memory can be transmitted to volatile memory, where the matrix read disturb operations can be performed.

In embodiments, the memory sub-system controller can be enhanced with direct memory access (DMA) capability. A controller with enhanced DMA capability can be configured to perform direct memory transfer from a source memory region to a destination memory region, and can perform basic arithmetic using an arithmetic logic unit (ALU). In implementations, the read value matrix calculations described above can be performed using the ALU of the DMA. Furthermore, the matrix read values can be transmitted, using DMA, from the one region of a volatile memory (e.g., DRAM scratch) to another region of volatile memory, and eventually to a non-volatile memory device. The newly determined matrix read values can be added to matrix read values stored in non-volatile memory, and the memory sub-system controller can use the additive matrix read values to determine whether read values for a block-die combination have reached the threshold value. The memory sub-system controller can use the DMA capability to perform the scans of the pages associated with the block-die combinations for which the associated matrix read value has reached or exceeded the threshold value. Furthermore, the ALU feature of the enhanced DMA controller can perform the read matrix value calculations.

Advantages of the present disclosure include, but are not limited to, reducing the number of read counters, thus reducing memory space used to maintain the read counters and freeing that memory space for other data. By using a matrix to estimate the read count of each block-die combination, implementations of the present disclosure maintain a single 32-bit counter for the total read counter, 16-bit counters for the number of die in the memory device plus 16-bit counters for the number of blocks per die in the memory device. This can greatly reduce the amount of memory space consumed by the read counters. Furthermore, the quality of service (QoS) is improved by reducing the number of data integrity scans performed on the at-risk pages, as well by using a memory sub-system controller with enhanced direct memory access (DMA) capability. The DMA's efficient transfer of the counter values from one memory region to another memory region while bypassing the processing device (e.g., CPU) in the memory subsystem, coupled with the ALU features of the DMA, reduces the processor workload required to execute the matrix read disturb implementation, thereby improving overall system QoS.

Figure 1:
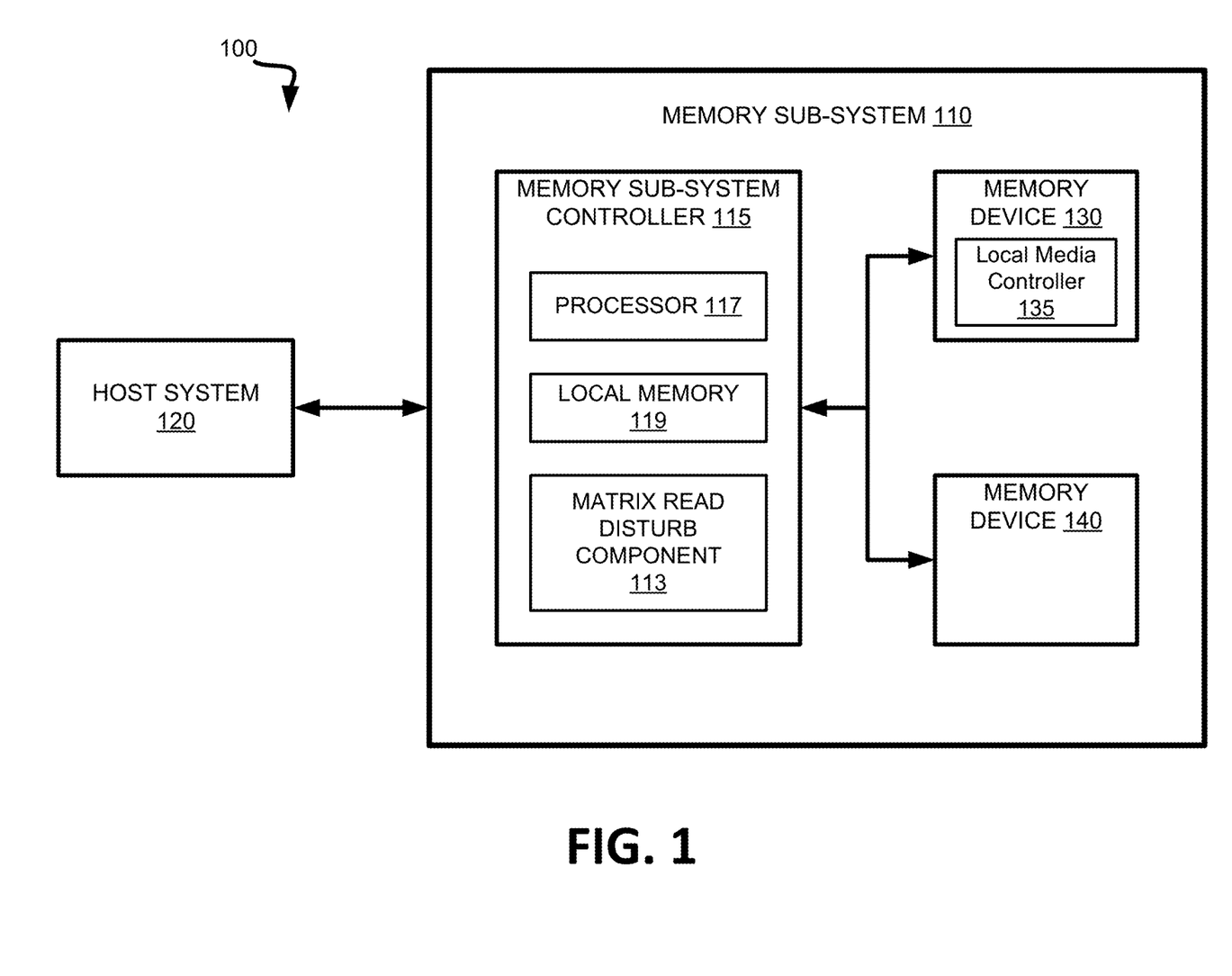
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDEVIMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a matrix read disturb component 113 that can populate a read disturb matrix with estimated read values for block-die combinations, and identify block-die combinations to be scanned for behavioral issues. In some embodiments, the memory sub-system controller 115 includes at least a portion of the matrix read disturb component 113. In some embodiments, the matrix read disturb component 113 is part of the host system 110, an application, or an operating system. In other embodiments, local media controller 135 includes at least a portion of matrix read disturb component 113 and is configured to perform the functionality described herein.

The matrix read disturb component 113 can maintain a plurality of read counters. The read counters can include a total read counter for a memory device, a die read counter for each die associated with the memory device, and a number of block read counters, where the number of block read counters is equal to the number of blocks per die associated with the memory device.

For each read page event (e.g., a read operation) detected, the matrix read disturb component 113 can increment the total read counter, as well as the die read counter and the block read counter associated with the specified block of the read page event. The read operation can include the logical block address of the where the data to be read is stored. The matrix read disturb component 113 can translate the logical block address into a physical block address. The physical block address can be defined by the intersection of a wordline and bitline, and can specify a physical block number and a physical die number where the data to be read is stored. The matrix read disturb component 113 can increment the die read counter of the physical die number specified in the physical block address, and can increment the block read counter of the physical block number specified in the physical block address. For example, if the detected read operation is to read data stored at die number 253 and block number 1,104, then the matrix read disturb component 113 can increment die read counter number 253 and block read counter number 1,104, as well as the total read counter.

The matrix read disturb component 113 can use the counters to populate a read disturb matrix. The values in the read disturb matrix represent an estimate of the number of read events each block has received. The read disturb matrix values can be stored in non-volatile memory, such as memory device 130. The matrix read disturb component 113 can identify read disturb matrix values that satisfy a pre-defined criterion (e.g., that meet and/or exceed a threshold value limit). The matrix read disturb component 113 identify the blocks (using the block-die combinations in the matrix) for which the associated read matrix values satisfy the criterion, and can perform a media management operation of the one or more pages associated with the identified blocks. A media management operation can include performing a scan of the one or more pages associated with the identified blocks to determine an error rate for the one or more pages. If an identified block contains one or more pages that have an error rate over an error threshold limit (i.e., the scan failed), the matrix read disturb component 113 can refresh the block by relocating the data stored at the block-die combination.

In implementations, the memory sub-system controller 110 can be enhanced with direct memory access (DMA) capability. The matrix read disturb component 113 can take advantage of the DMA capability to efficiently transmit the data from one region of memory to another region of memory (e.g., transmit the counter values within volatile memory, and/or transmit the matrix values between volatile memory and non-volatile memory). Furthermore, the matrix read disturb component 113 can take advantage of the ALU component of the DMA enhanced memory sub-system controller to efficiently calculate the read matrix values. Further details with regards to the operations of the matrix read disturb component 113 are described below.

Figure 2:
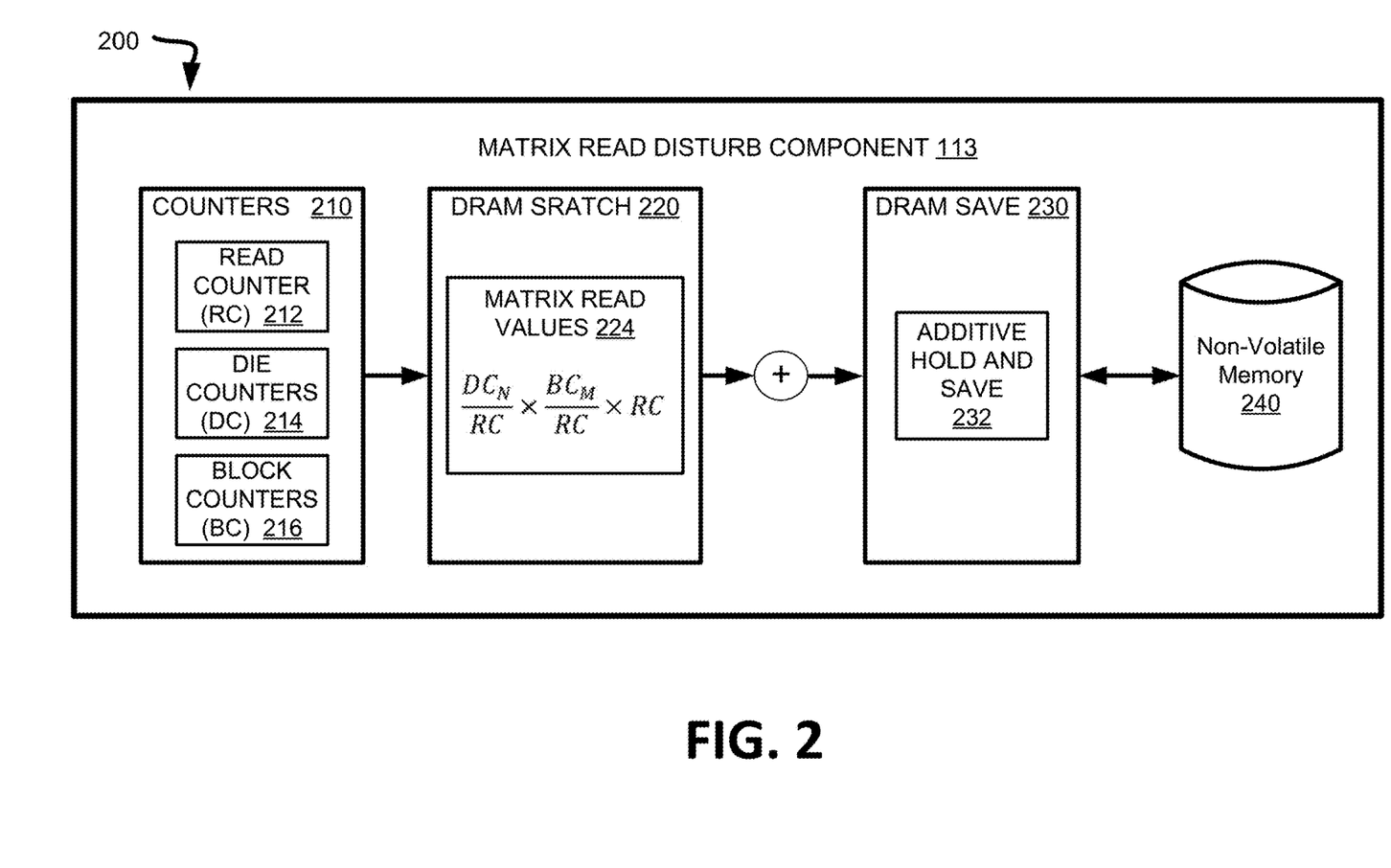
FIG. 2 illustrates an example workflow of the matrix read disturb with enhanced direct memory access capability, in accordance with some embodiments of the present disclosure.

FIG. 2 illustrates an example workflow of the matrix read disturb component 113 with enhanced direct memory access (DMA) capability, in accordance with some embodiments of the present disclosure. Matrix read component 113 can maintain a matrix of estimated numbers of read events for each memory device in the memory sub-system. Matrix read component 113 can maintain read counters 210 in tightly coupled memory (TCM). Counters 210 can include a total read counter 212 that is incremented responsive to each read page event detected by the memory device. Die counters 214 can include multiple die counters. The number of die counters correlates to the number of die stored on the memory device. For example, for a memory sub-system that has a range of die from 8 to 256, the total number of die counters stored in die counters 214 would be 256. Block counters 216 can include multiple block counters. The number of block counters correlates to the number of blocks per die. For example, for a memory sub-system that stores 1,352 blocks per die, block counters 216 can store 1,352 block counters. In this example, counters 210 can maintain 1 total read counter (RC) 212, 256 die counters (DC) 214, and 1,352 block counters (BC) 216. In some implementations, the total read counter (RC) 212 can be a 32-bit counter, and the die read counters (DC) 214 and block read counters (BC) 216 can be 16-bit counters. Responsive to detecting a read page event, each relevant counter is incremented by a specified value (e.g., by 1); that is, the total read counter, the die read counter associated with the block specified in the read page event, and the block read counter associated with the block specified in the read page event, are each incremented responsive to detecting the read page event.

Matrix read disturb component 113 can transmit the read counter values from counters 210 from TCM to another region of volatile memory, such as DRAM scratch 220. The counter values can be transmitted from TCM to DRAM scratch after garbage collection, once a read counter reaches a maximum value, upon a predetermined time period, and/or at another time. When the counter values are transmitted from TCM to DRAM scratch, the counter values in counters 210 are reset. In implementations, the TCM counters may be reset with a preload value. Further details regarding the preload values are described below with respect to FIG. 3.

Once matrix read disturb component 113 transmits the values of the counters 210 to DRAM scratch 220, the matrix read disturb component 113 calculates the matrix read values 224. As shown in FIG. 2, the matrix read values 224 can be calculated by multiplying the share of read events that occurred for a particular die $$\left(\frac{DC_N}{RC}\right)$$

by the share of read events that occurred for a particular block $$\left(\frac{BC_N}{RC}\right),$$

and multiplying that by the total read count value (RC). That is, for the block-die combination M-N, the matrix read value is $$\frac{DC_N}{RC} \times \frac{BC_N}{RC} \times RC,$$

where $DC_N$ represents the die counter value for die N, $BC_M$ represents the block counter value for block M, and RC represents the total read counter value. In implementations, the matrix read disturb component 113 can calculate the matrix read values 224 by multiplying the die counter value by the block counter value divided by the total read counter value, i.e., $DC_N \times BC_M \div RC$.

Matrix read disturb component 113 can transmit the matrix read values 224 to another region of volatile memory, such as DRAM Save 230. The additive hold and save component 232 can add the matrix read values 224 received from DRAM Scratch 220 to existing matrix read values in DRAM Save 230. The matrix values in additive hold and save 232 can be transmitted to non-volatile memory 240 upon memory sub-system power down event, and optionally on a predetermined time interval. Upon a power on event of the memory sub-system, the matrix read values stored in non-volatile memory 240 can be transmitted to DRAM save 230. The matrix read disturb component 113 can execute the read disturb operations based on the matrix read values stored in DARM save 230. The read disturb operations include performing media management of the at-risk pages. For example, the read disturb operations can include performing data integrity scans of the at-risk pages (i.e., the pages associated with the block-die combinations that have matrix read values over a certain threshold value), and relocating data stored on blocks that have failed the data integrity scan (i.e., the blocks for which the error rate of one or more at-risk pages is above a certain threshold error rate value).

The matrix read disturb component 113 workflow can be enhanced using a memory sub-system controller with direct memory access (DMA) capability. The memory sub-system controller with enhanced DMA capability can efficiently transmit the matrix read values 224 from DRAM scratch 220 to DRAM save 230, and between DRAM save 230 and non-volatile memory 240. Furthermore, the memory sub-system controller with enhanced DMA capability can perform some ALU manipulation. Specifically, the memory sub-system controller with enhanced DMA capability can calculate the matrix read values 224 in DRAM scratch 220 by performing the arithmetic calculations described above. Furthermore, the memory sub-system controller with enhanced DMA capability can perform the additive hold and save 232 feature by adding the matrix read values 224 to the DRAM save 230 matrix values. The memory sub-system controller with enhanced DMA capability can also execute the read disturb operations, i.e., compare the read matrix values to the read value threshold limit to determine whether to perform data integrity scans. Additionally, the memory sub-system controller with enhanced DMA capability can transmit the matrix values stored in non-volatile memory 240 to DRAM save 230, and can preload the counter values in DRAM scratch 220. All of these functions, when performed by a memory sub-system controller with enhanced DMA capability, reduce the processor workload and improve overall system quality of service.

Figure 3:
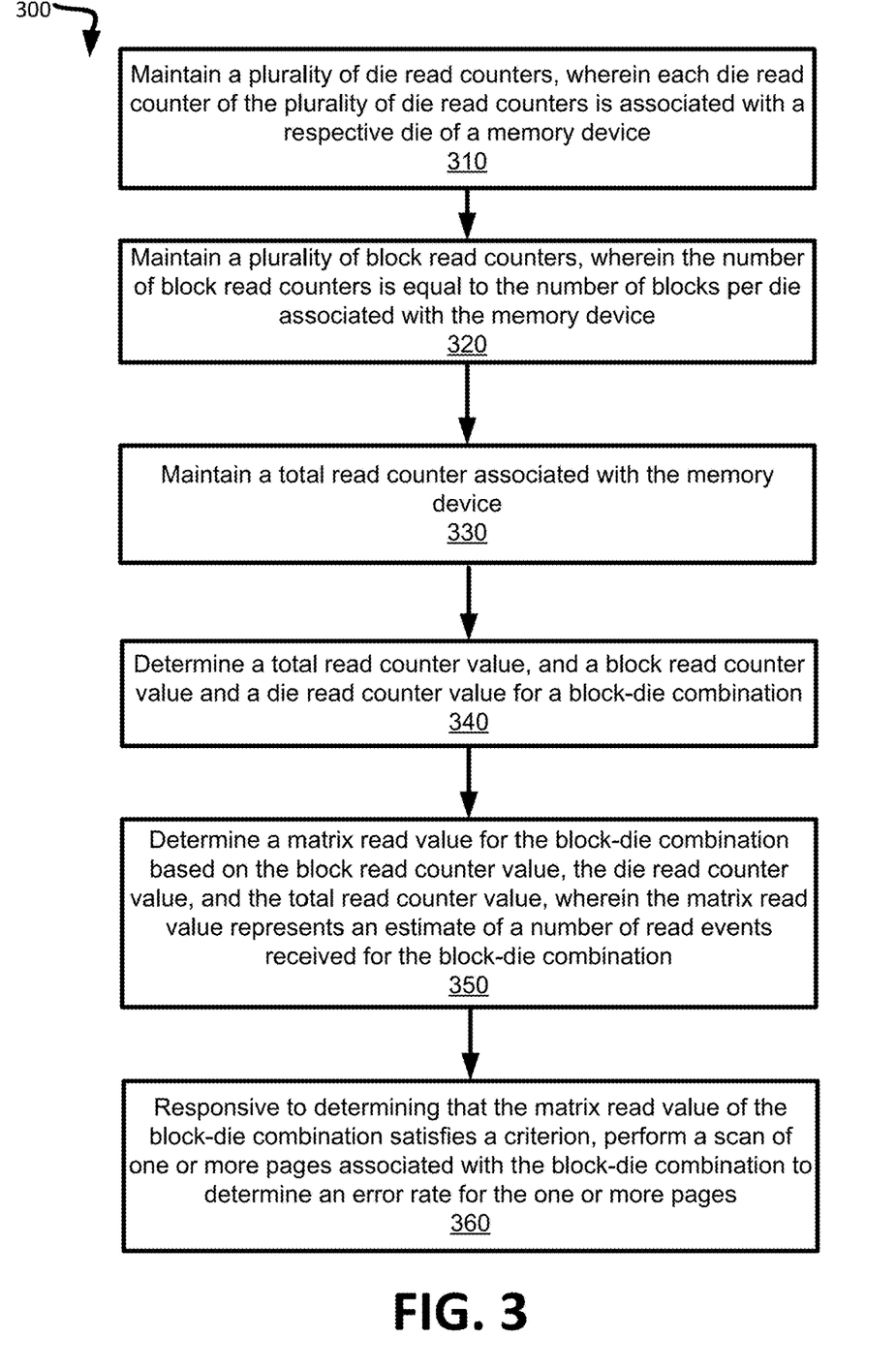
FIG. 3 is a flow diagram of an example method to implement a read disturb matrix, in accordance with some embodiments of the present disclosure.

FIG. 3 is a flow diagram of an example method 300 to implement a read disturb matrix, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the matrix read disturb component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains a plurality of die read counters. Each die read counter of the plurality of die read counters can be associated with a respective die of a memory device. At operation 320, the processing logic maintains a plurality of block read counters. The number of block read counters can be equal to the number of blocks per die associated with the memory device. For example, for a memory device that has 256 die and 1,352 blocks per die, the processing logic maintains 256 die read counters and 1,352 block read counters. In implementations, the die read counters and the block read counters are 16-bit counters.

At operation 330, the processing logic maintains a total read counter associated with the memory device. In implementations, the total read counter is a 32-bit counter. The total read counter, the die read counters, and the block read counters can be maintained in tightly coupled memory.

The processing logic can detect a read page event, e.g., a read operation from the host system. The read page event can include a logical block address. The processing logic can translate the logical block address into a physical block address, for example using a logical-to-physical (L2P) mapping data structure (e.g., a L2P table). The physical block address can specify the physical block and die from which data is to be read. The processing logic can identify the block read counter associated with the block in the physical block address, and the die read counter associated with the die in the physical block address. In response to receiving the read page event, the processing logic can increment the identified block read counter by a specified value (e.g., by one), the identified die read counter by a specified value (e.g., by one), and the total read counter by a specified value (e.g., by one).

At operation 340, the processing logic determines a value of a block read counter and a value of a die read counter for a specified block of the memory device.

At operation 350, the processing logic determines an estimated number of read events associated with the specified block of the memory device based on the value of the block read counter, the value of the die read counter, and a value of the total read counter. To determine the estimated number of read events associated with the specified block, the processing logic can multiply the value of the die read counter by the value of the block read counter and divide by the value of the total read counter. The matrix read value is rounded to the nearest integer.

In embodiments, the processing logic can transmit the value of the total read counter, the values of the block read counter, and the values of the die read counters from TCM to a scratch region of a volatile memory device. The processing logic can then determine the estimated numbers of read events in the scratch region of the volatile memory device, and can save the estimated numbers of read events in the volatile memory device. The processing logic can add the newly determined estimated numbers of read events to the estimated numbers of read events stored in the volatile memory device. Responsive to the processing logic detecting a power down event of the memory device, the processing logic can transmit the estimated numbers of read events to a non-volatile memory device. Additionally or alternatively, the processing logic can transmit the estimated numbers of read events to a non-volatile memory device on a predetermined time interval, or in response to another event.

At operation 360, responsive to determining that the estimated number of read events associated with the specified block satisfies a predefined criterion, the processing logic performs a media management operation of one or more pages associated with the specified block of the memory device. The predefined criterion can be a read value threshold limit, such that the processing logic performs a media management operation of the one or more pages associated with the specified block for which the estimated number of read events exceeds the read value threshold limit. In some implementations, the media management operation can be a scan of one or more pages associated with the specified block to determine an error rate for the one or more pages. The scan can be a data integrity check to verify that the data stored at the one or more pages associated with the specified block do not include errors over the error threshold criterion. For example, the scan can determine the raw bit error rate (RBER) of the one or more pages associated with the specified block, and the error threshold criterion can be a RBER limit.

In embodiments, responsive to determining the estimated number of read events for each block of the memory device, the processing logic can reset the total read counter, the plurality of die read counters, and the plurality of block read counters. Upon resetting the counters and/or prior to starting the counters, the processing logic can preload the counters with specified values. In some implementations, the processing logic can add a preload count within a specified range. Some read workloads may be executed in a manner where most read disturb counters reach the read value threshold limit at or around the same time. This phenomenon is sometimes called a read disturb scan storm, and can adversely affect the performance of the memory sub-system. To avoid a read disturb scan storm, the processing logic can offset the counters with various preload read values. The offset values can be random values within a predefined range, or can be incremental. For instance, the processing logic can preload the first die read counter with a value of 100, and increase the offset value for each following die read counter. The processing logic can similarly preload the block read counters with offset values within a predefined range. The processing logic can preload the total read counter to match the offset values added to the die counters and block counters.

In embodiments, the processing logic can preload the counter value to account for any inaccuracies of the estimated number of read events in the matrix. Using a matrix to estimate the number of read events for each block-die combination, rather than having a dedicated counter for each block in the memory device, can result in read counts that may not be as accurate as conventional read counts. The processing logic can apply a 6-sigma random read offset. In implementations, the finite 6-sigma read offset can be in the range of 250 to 500 counts. This preload count can allow the processing logic to scan a block at or below the read value threshold limit, and avoid situations in which the true read count is above the read value threshold limit. The processing logic can add a first preload count the total read counter, a first set of preload counts to the die read counters, and a second set of preload counts to the block read counters. Each preload count in the first set of preload counts is added to one of the die read counters, and each preload count in the second set of preload counts is added to one of the block read counters.

In embodiments, an asynchronous power loss event can result in losing the current read count. Hence, in response to detecting an asynchronous power loss event, the processing logic can preload the counters to compensate for the risk of losing the current estimated number of read events. The processing logic can add a first preload count to the total read counter and a second preload count to each block read counter in the plurality of block read counters. In implementations, the processing logic can add a third preload count to each die read counter in the plurality of die read counters. To avoid losing the current block read count, these preload count values can be relatively high. For example, the preload count added to the total read counter can be 50,000, and the preload count added to each block read counter can be a fraction of 50,000. In another example, the preload count added to each block read counter can be 50,000, and the preload count added to the total read counter can be 50,000 times the number of blocks.

In response to determining that the error rate of the one or more pages satisfies the error threshold criterion (i.e., the scan failed because the error rate of the one more pages exceeded the error threshold limit), the processing logic relocates the data stored at the specified block to another block.

On the other hand, in response to determining that the error rate of each of the one or more pages does not satisfy the error threshold criterion (i.e., the scan passed because the error rate of each page scanned does not exceed the error threshold limit), the processing logic leaves the data stored at the specified block. However, there is a high likelihood that at least one of the one or more pages associated with the specified block is nearing failure. To ensure that the failure is caught in a timely manner, following a scan pass, the processing logic can add a preload count to each counter associated with the specified block. Hence, the processing logic can add a first preload count to the total read counter, a second preload count to the die read counter associated with the specified block, and a third preload count to the block read counter associated with the specified block. The first preload count added to the total read counter should equal the second preload count plus the third preload count. The preload counts can be a specified share of the criterion, for example 25%, 50%, or 75% of the read value threshold limit. This added preload count can result in reducing the additional number of read counts on the weakened blocks.

Figure 4:
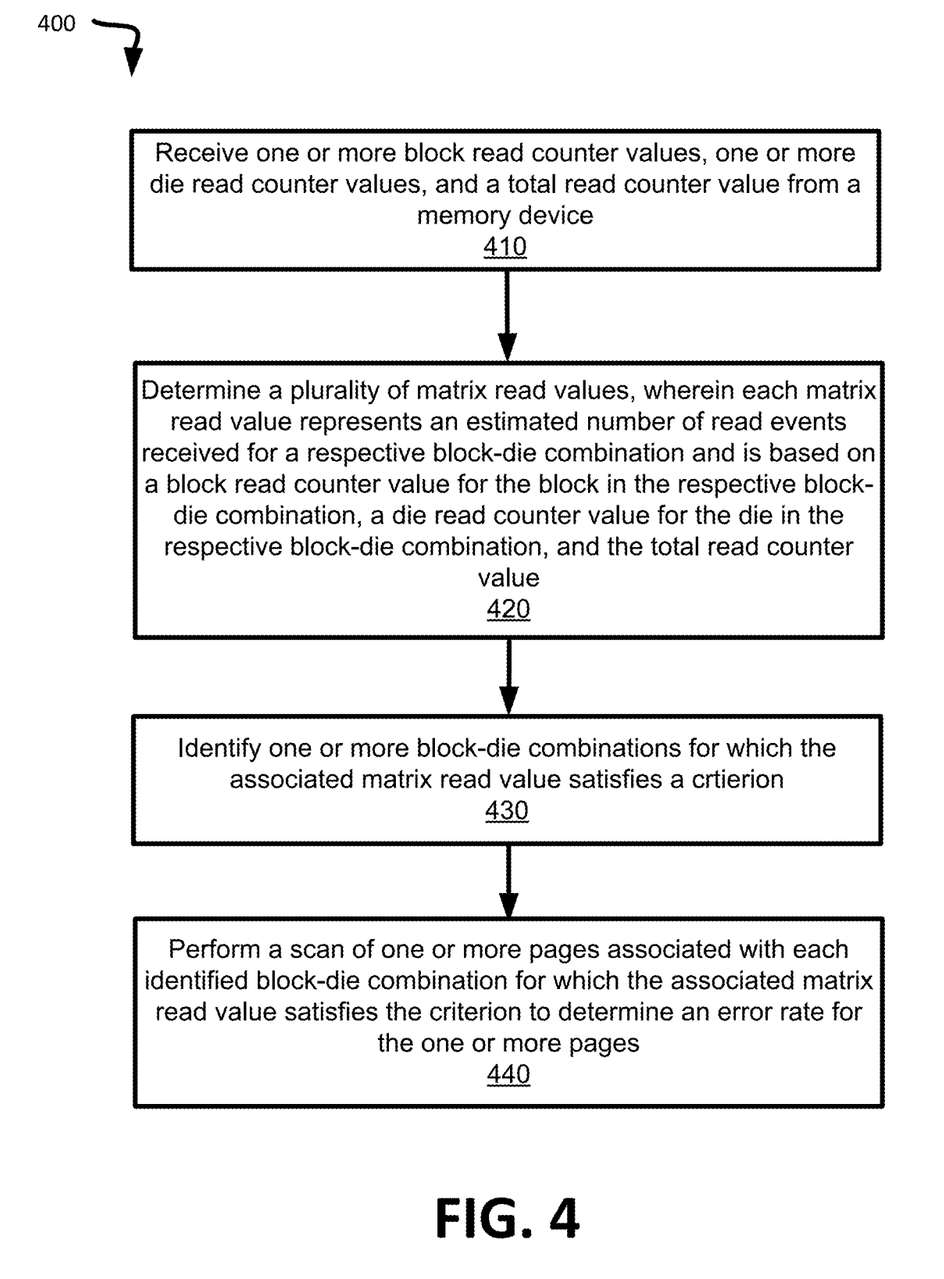
FIG. 4 is a flow diagram of an example method to implement a read disturb matrix using a controller with DMA capability, in accordance with some embodiments of the present disclosure.

FIG. 4 is a flow diagram of an example method 400 to implement a read disturb matrix using a controller with DMA capability, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 400 is performed by the matrix read disturb component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives one or more block read counter values, one or more die read counter values, and a total read counter value from a memory device.

At operation 420, the processing logic determines a plurality of estimated numbers of read events. Each estimated number of read events is associated with a block of the memory device and is based on one of the block read counter values (i.e., the block read counter value associated with the block), one of the die read counter values (i.e., the die read counter value associated with the block), and the total read counter value.

In order to determine the plurality of estimated numbers of read events, for each specified block, the processing logic multiplies the block read counter value of the specified block by the die read counter value of the specified block and divides by the total read counter value. The matrix read value is rounded to the nearest integer.

In embodiments, the processing logic receives existing estimated numbers of read events stored in non-volatile memory. The processing logic can add the plurality of estimated numbers of read events to the existing estimated numbers of read events to determine updated additive estimated numbers of read events. The processing logic can transmit the additive estimated numbers of read events to the non-volatile memory device, either periodically (e.g., on a predetermined schedule, such as every hour) or in response to a determined event, such as a power down event of the memory sub-system.

At operation 430, the processing logic identifies one or more blocks for which the associated estimated number of read events satisfies a predefined criterion. The predefined criterion can be a read value threshold limit, such that the processing logic identifies the blocks for which the associated estimated number of read events meets and/or exceeds the read value threshold limit.

At operation 440, the processing logic performs a media management operation of one or more pages associated with each identified block for which the associated estimated number of read events satisfied the predefined criterion. Performing the media management operation may include performing a scan of one or more pages associated with each identified block for which the associated estimated number of read events satisfies the predefined criterion to determine an error rate for the one or more pages. The scan can be a data integrity check to verify that the data stored at the one or more pages associated with the block do not include errors over the error threshold criterion. For example, the scan can determine the raw bit error rate (RBER) of the one or more pages associated with the block-die combination, and the error threshold criterion can be a RBER limit.

In embodiments, in response to determining that the error rate of the one or more pages satisfies the error threshold criterion (i.e., the scan failed because the error rate of the one more pages exceeded the error threshold limit), the processing logic relocates the data stored at the identified block to another block-die combination.

On the other hand, in response to determining that the error rate of each of the one or more pages does not satisfy the error threshold criterion (i.e., the scan passed because the error rate of each page scanned does not exceed the error threshold limit), the processing logic leaves the data stored at the block. However, there is a high likelihood that at least one of the one or more pages associated with the identified block is nearing failure. To ensure that the failure is caught in a timely manner, following a scan pass, the processing logic can add a preload count to each counter associated with the identified block. Hence, the processing logic can add a first preload count to the total read counter, a second preload count to the die read counter associated with the identified block, and a third preload count to the block read counter associated with the identified block. The first preload count added to the total read counter should equal the second preload count plus the third preload count. The preload counts can be a specified share of the criterion, for example 25%, 50%, or 75% of the read value threshold limit. This added preload count can result in reducing the additional number of read counts on the weakened blocks.

In embodiments, the processing logic can preload the counters with specified values. In some implementations, the processing logic can add a preload count within a specified range. Some read workloads may be executed in a manner where most read disturb counters reach the read value threshold limit at or around the same time. This phenomenon is sometimes called a read disturb scan storm, and can adversely affect the performance of the memory sub-system. To avoid a read disturb scan storm, the processing logic can offset the counters with various preload read values. The offset values can be random values within a predefined range, or can be incremental. For instance, the processing logic can preload the first die read counter with a value of 100, and increasing the offset value for each following die read counter. The processing logic can similarly preload the block read counters with offset values within a predefined range. The processing logic can preload the total read counter to match the offset values added to the die counters and block counters.

In embodiments, the processing logic can preload the counter value to account for any inaccuracies of the estimated number of read events in the matrix. Using a matrix to estimate the number of read events for each block-die combination, rather than having a dedicated counter for each block in the memory device, can result in read counts that may not be as accurate as conventional read counts. The processing logic can apply a 6-sigma random read offset. In implementations, the finite 6-sigma read offset can be in the range of 250 to 500 counts. This preload content can allow the processing logic to scan a block at or below the read value threshold limit and avoid situations in which the true read count is above the read value threshold limit. The processing logic can add a first preload count the total read counter, a first set of preload counts to the die read counters, and a second set of preload counts to the block read counters. Each preload count in the first set of preload counts is added to one of the die read counters, and each preload count in the second set of preload counts is added to one of the block read counters.

In embodiments, an asynchronous power loss event can result in losing the current read count. Hence, in response to detecting an asynchronous power loss event, the processing logic can preload the counters to compensate for the risk of losing the current estimated number of read events. The processing logic can add a first preload count to the total read counter and a second preload count to each block read counter in the plurality of block read counters. In implementations, the processing logic can add a third preload count to each die read counter in the plurality of die read counters. To avoid losing the current block read count, these preload count values can be relatively high. For example, the preload count added to the total read counter can be 50,000, and the preload count added to each block read counter can be a fraction of 50,000. In another example, the preload count added to each block read counter can be 50,000, and the preload count added to the total read counter can be 50,000 times the number of blocks.

Figure 5:
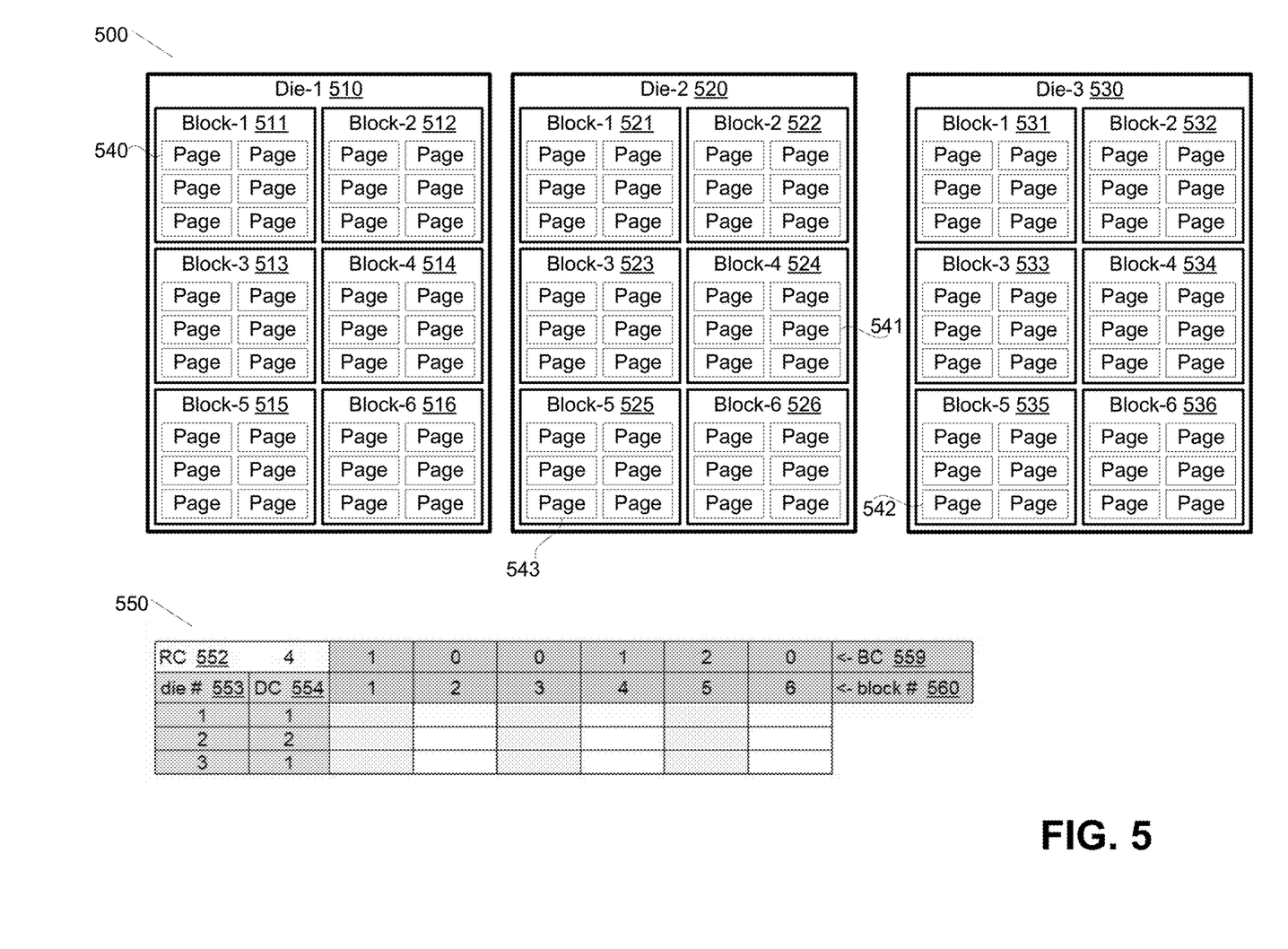
FIG. 5 illustrates an example arrangement of a memory device within a memory sub-system and the corresponding read counters, in accordance with some embodiments of the present disclosure.

FIG. 5 illustrates an example arrangement of a memory device within a memory sub-system and the corresponding read counters, in accordance with some embodiments of the present disclosure. In general, the memory sub-system 500 can correspond to the memory system 110 of FIG. 1. In some examples, the matrix read disturb component 113, as described in FIG. 1, can perform the operations described in reference to FIG. 5.

In the example architecture of FIG. 5, a memory device in the memory sub-system 500 has 3 die (die-1 510, die-2 520, and die-3 530). Each die has 6 blocks. For example, die-1 510 has block-1 511, block-2 512, block-3 513, block-4 514, block-5 515, and block-6 516. Each block can contain multiple pages. It should be noted that the example architecture in FIG. 5 is a simplistic illustration for ease of explanation, and that a memory device can have many more die and many more blocks per die.

In an implementation, the memory sub-system detects a read page event (i.e., a read request from a host system). The read page event can be associated with logical block address. For example, the read request can include a logical block address. The memory sub-system controller can translate the logical block address into a physical block address. The physical block address can include a block number and a die number at which the data to be read is stored.

As illustrated in FIG. 5, the memory sub-system controller detects read page events 540, 541, 542, and 543. Read page event 540 includes a logical block address that, when translated into a physical block address, directs the memory sub-system controller to read a memory page stored in block-1 511 of die-1 510. Read page event 541 includes a logical block address that, when translated into a physical block address, directs the memory sub-system controller to read a memory page stored in block-4 524 of die-2 520. Read page event 542 includes a logical block address that, when translated into a physical block address, directs the memory sub-system controller to read a memory page stored in block-5 535 of die-3 530. Read page event 543 includes a logical block address that, when translated into a physical block address, directs the memory sub-system controller to read a memory page stored in block-5 525 of die-2 520.

The memory sub-system controller can identify the read counters associated with each read page event and increment the associated counters. Specifically, in response to detecting read page event 540, the memory sub-system controller can identify the die counter (DC 554) associated with die number 1 (die #553), and block counter (BC 559) associated with block number 1 (block #560). In response to detecting read page event 541, the memory sub-system controller can identify the die counter (DC 554) associated with die number 2 (die #553), and block counter (BC 559) associated with block number 4 (block #560). In response to detecting read page event 542, the memory sub-system controller can identify the die counter (DC 554) associated with die number 3 (die #554), and block counter (BC 559) associated with block number 5 (block #560). In response to detecting read page event 543, the memory sub-system controller can identify the die counter (DC 554) associated with die number 2 (die #554), and block counter (BC 559) associated with block number 5 (block #560).

The memory sub-system controller can increment each die counter in the matrix 550 in response to detecting each read page event. As shown in FIG. 5, die counter (DC 554) associated with die number 1 (die #553) shows a total count of 1; die counter (DC 554) associated with die number 2 (die #553) shows a total count of 2; and die counter (DC 554) associated with die number 3 (die #553) shows a total count of 1. Furthermore, block counter (BC 559) associated with block number 1 (block #560) shows a total count of 1; block counter (BC 559) associated with block number 2 (block #650) shows a total count of 0; block counter (BC 559) associated with block number 3 (block #650) shows a total count of 0; block counter (BC 559) associated with block number 4 (block #650) shows a total count of 1; block counter (BC 559) associated with block number 5 (block #650) shows a total count of 2; and block counter (BC 559) associated with block number 6 (block #650) shows a total count of 0. Read counter (RC 552) shows a total of 4 read page events received.

Figure 6A:
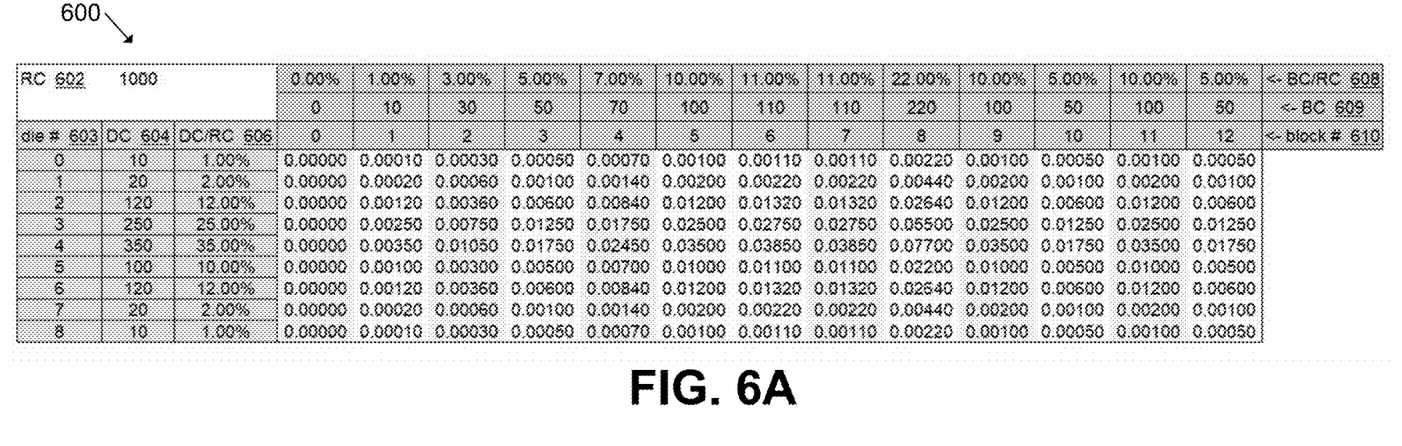
FIG. 6A illustrates an example first step in determining the matrix read values, generated in accordance with some embodiments of the present disclosure.

FIG. 6A illustrates an example first step in determining the matrix read values representing the estimated numbers of read events, in accordance with embodiments of the present disclosure. Matrix 600 in FIG. 6A represents the share of the reads received for each block-die combination. As shown in FIG. 6A, the read disturb matrix maintains a total read count RC 602; the total read count is 1000. The read disturb matrix maintains a die counter for each die in the memory device. The die number is shown in column 603, and the die counter is shown in column 604. In the example illustrated in FIG. 6A, there are 9 die in the memory device; this is merely illustrative, and there may be fewer or more die in a memory device. Column 606 shows the share of reads received for each die, i.e., each die counter value divided by the total read counter value.

The read disturb matrix also maintains a block counter for the number of blocks per die in the memory device. In the example illustrated in FIG. 6A, there are 13 blocks per die. This is merely illustrative, and there may be fewer or more blocks per die in a memory device. Row 610 shows the block number, and row 609 shows the block counter for each block number. Row 608 shows the share of reads received for each block number, i.e., each block counter value divided by the total read counter value.

Matrix 600 is populated by multiplying the share of reads received for a particular die by the share of reads received for a particular block number. For example, the matrix value for the block stored at block-5 die-6 is 10% times 12%, which is 0.01200. As another example, the matrix value for block stored at block-4 die-7 is 7% times 2% which is 0.00140.

Figure 6B:
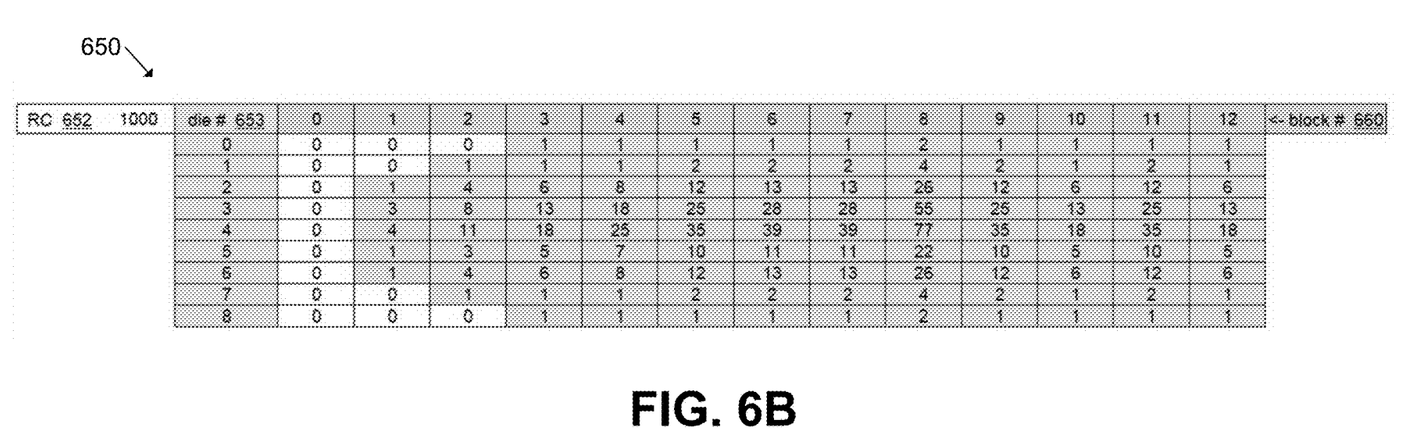
FIG. 6B illustrates an example read disturb matrix, generated in accordance with some embodiments of the present disclosure.

FIG. 6B illustrates an example read disturb matrix 650, generated in accordance with embodiments of the present disclosure. The read disturb matrix 650 is generated by multiplying the values from the matrix 600 in FIG. 6A by the total read count value 652, and rounding to the nearest integer. For example, for the block represented by block-die combination block-5 and die-6, the value in the matrix 600 illustrated in FIG. 6A is 0.01200. The total read count RC 652 is 1,000. Hence, the matrix read value for block-die combination block-5 and die-6 is 0.01200×1,000=12. As another example, the matrix 600 value for block-die combination block-4 and die-7 is 0.00140. This value multiplied by the total read count is 0.00140*1,000=1.4, rounded to the nearest integer is 1. Hence, the matrix read disturb 650 value for the block-die combination block-4 and die-7 is 1. The matrix read values stored in matrix 650 represent estimated numbers of read events associated with each block of the memory device.

The matrix read disturb component (e.g., matrix read disturb component 113 from FIG. 1) identifies blocks (i.e., block-die combinations in the matrix) for which the matrix read value in matrix 650 meets and/or exceeds a predefined criterion, such as a read value threshold limit. For example, if the read value threshold limit is set to 50, the matrix read disturb component can identify block-die combinations block-8 die-3 and block-8 die-4 in matrix 650 as meeting and/or exceeding the read value threshold limit. The matrix read disturb component can then scan the pages associated with the identified blocks (block-8 die-3 and block-8 die-4) to determine an error rate for the pages, and can refresh the blocks that have one or more pages with an error rate exceeding an error rate threshold.

Figure 7:
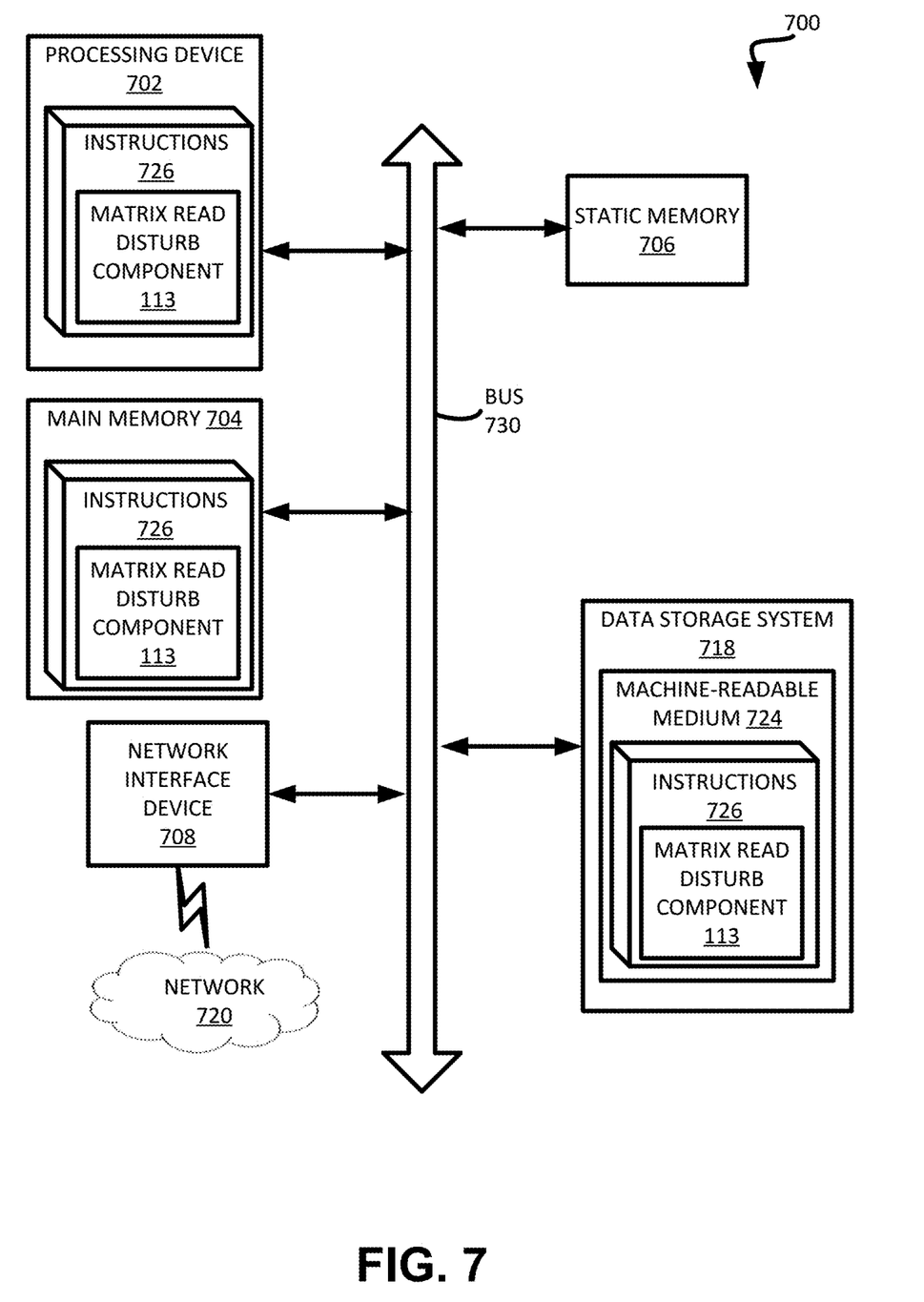
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the matrix read disturb component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a matrix read disturb component (e.g., the matrix read disturb component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   maintaining, by a processing device, a plurality of die read counters, wherein each die read counter of the plurality of die read counters is associated with a respective die of a memory device;
   maintaining a plurality of block read counters;
   maintaining a total read counter associated with the memory device;
   determining a value of a block read counter and a value of a die read counter for a specified block of the memory device;
   determining, based on the value of the block read counter, the value of the die read counter, and a value of the total read counter, an estimated number of read events associated with the specified block of the memory device; and
   responsive to determining that the estimated number of read events satisfies a predefined criterion, performing a media management operation of one or more pages associated with the specified block of the memory device.

2. The method of claim 1, wherein a number of the plurality of block read counters is equal to a number of blocks per die associated with the memory device.

3. The method of claim 1, wherein determining the estimated number of read events associated with the specified block of the memory device comprises multiplying the value of the block read counter by the value of the die read counter and dividing by the value of the total read counter.

4. The method of claim 1, further comprising:
detecting a read page event associated with a logical block address;
translating the logical block address into a physical block address, wherein the physical block address identifies a block and a die;
identifying a block read counter of the plurality of block read counters associated with the block;
identifying a die read counter of the plurality of die read counters associated with the die; and
incrementing the identified block read counter, the identified die read counter, and the total read counter.

5. The method of claim 1, further comprising:
responsive to detecting a power down event of the memory device, transmitting the estimated number of read events associated with the specified block to a non-volatile memory device.

6. The method of claim 1, wherein performing the media management operation of the one or more pages associated with the specified block of the memory device comprises:
performing a scan of the one or more pages associated with the specified block;
determining, based on the scan, an error rate of the one or more pages associated with the specified block;
responsive to determining that the error rate of one of the one or more pages satisfies an error threshold criterion, relocating data stored at the specified block to another block; and
responsive to determining that the error rate of each of the one or more pages does not satisfy the error threshold criterion, adding a first preload count to the total read counter, a second preload count to the die counter associated with the specified block, and a third preload count to the block counter associated with the specified block, wherein each preload count is a specified share of the criterion.

7. The method of claim 1, further comprising:
adding a first preload count to the total read counter, a first set of preload counts to the plurality of die read counters wherein each preload count in the first set of preload counts is added to one of the die read counters in the plurality of die read counters, and a second set of preload counts to the plurality of block read counters wherein each preload count in the second set of preload counts is added to one of the block read counters in the plurality of block read counters, wherein each preload count is within a specified range.

8. The method of claim 1, further comprising:
responsive to detecting an asynchronous power loss event, adding a first preload count to the total read counter and a second preload count to each block read counter in the plurality of block read counters.

9. A system comprising:
a plurality of memory devices;
a processing device, operatively coupled with the plurality of memory devices; and
a direct memory access (DMA) controller, operatively coupled with the plurality of memory devices, to perform operations comprising:
receiving one or more block read counter values, one or more die read counter values, and a total read counter value from a memory device of the plurality of memory devices;
determining a plurality of estimated numbers of read events, wherein each estimated number of read event is associated with a block of the memory device and is based one of the block read counter values, one of the die read counter values, and the total read counter value;
identifying one or more blocks for which an associated estimated number of read events satisfies a predefined criterion; and
performing a media management operation of one or more pages associated with each identified block for which the associated estimated number of read events satisfies the predefined criterion.

10. The system of claim 9, wherein determining the plurality of estimated number of read events comprises, for each specified block, multiplying the block read counter value of the specified block by the die read counter value of the specified block and dividing by the total read counter value.

11. The system of claim 9, further comprising:
receiving existing estimated numbers of read events from a non-volatile memory device;
determining additive read events by adding the plurality of estimated numbers of read events to the existing estimated numbers of read events; and
transmitting the additive read events to the non-volatile memory device.

12. The system of claim 9, wherein performing the media management operation comprises:
performing a scan of the one or more pages associated with each identified block for which the associated estimated number of read events satisfies the predefined criterion;
determining, based on the scan, an error rate of the one or more pages;
responsive to determining that the error rate of one of the one or more pages satisfies an error threshold criterion, relocating data stored at the identified block to another block; and
responsive to determining that the error rate of each of the one or more pages does not satisfy the error threshold criterion, adding a first preload count to the total read counter, a second preload count to the die counter associated with the identified block, and a third preload count to the block counter associated with the identified block, wherein each preload count is a specified share of the criterion.

13. The system of claim 9, further comprising:
adding a first preload count to the total read counter, a first set of preload counts to the die read counter values wherein each preload count in the first set of preload counts is added to one of the die read counter values, and a second set of preload counts to block read counter values wherein each preload count in the second set of preload counts is added to one of the block read counter values, wherein each preload count is within a specified range.

14. The system of claim 9, further comprising:
responsive to determining an asynchronous power-loss event, adding a first preload count to the total read counter and a second preload count to each block read counter value.

15. A non-transitory computer-readable storage medium comprising instructions that, when executed by a processing device, cause the processing device to perform operations comprising:

maintaining a plurality of die read counters, wherein each die read counter of the plurality of die read counters is associated with a respective die of a memory device;

maintaining a plurality of block read counters;

maintaining a total read counter associated with the memory device;

determining a value of a block read counter and a value of a die read counter for a specified block of the memory device;

determining, based on the value of the block read counter, the value of the die read counter, and the value of the total read counter, an estimated number of read events associated with the specified block of the memory device; and responsive to determining that the estimated number of read events satisfies a predefined criterion, performing a media management operation of one or more pages associated with the specified block of the memory device.

16. The non-transitory computer-readable storage medium of claim 15, wherein a number of the plurality of block read counters is equal to a number of blocks per die associated with the memory device.

17. The non-transitory computer-readable storage medium of claim 15, wherein determining the estimated number of read events associated with the specified block of the memory device comprises multiplying the value of the block read counter by the value of the die read counter and dividing by the value total read counter.

18. The non-transitory computer-readable storage medium of claim 15, further comprising:

detecting a read page event associated with a logical block address;

translating the logical block address into a physical block address, wherein the physical block address identifies a block and a die;

identifying a block read counter of the plurality of block read counters associated with the block;

identifying a die read counter of the plurality of die read counters associated with the die; and incrementing the identified block read counter, the identified die read counter, and the total read counter.

19. The non-transitory computer-readable storage medium of claim 15, further comprising:

determining an error rate of the one or more pages associated with the specified block;

responsive to determining that the error rate of one of the one or more pages satisfies an error threshold criterion, relocating data stored at the specified block to another block; and responsive to determining that the error rate of each of the one or more pages does not satisfy the error threshold criterion, adding a first preload count to the total read counter, a second preload count to the die counter associated with the specified block, and a third preload count to the block counter associated with the specified block, wherein each preload count is a specified share of the criterion.

20. The non-transitory computer-readable storage medium of claim 15, further comprising:

adding a first preload count to the total read counter, a first set of preload counts to the plurality of die read counters wherein each preload count in the first set of preload counts is added to one of the die read counters in the plurality of die read counters, and a second set of preload counts to the plurality of block read counters wherein each preload count in the second set of preload counts is added to one of the block read counters in the plurality of block read counters, wherein each preload count is within a specified range.

* * * * *